US009591442B2

(12) United States Patent
Heed et al.

(10) Patent No.: US 9,591,442 B2
(45) Date of Patent: *Mar. 7, 2017

(54) METHOD AND SYSTEM FOR IMPLEMENTING NAVIGATION USING BOUNDED GEOGRAPHIC REGIONS

(71) Applicants: John Culver Heed, Milan, MI (US); Thomas Paul Heed, Ann Arbor, MI (US)

(72) Inventors: John Culver Heed, Milan, MI (US); Thomas Paul Heed, Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/678,951

(22) Filed: Apr. 4, 2015

(65) Prior Publication Data

US 2016/0290814 A1    Oct. 6, 2016

(51) Int. Cl.
G01C 21/34 (2006.01)
H04W 4/02 (2009.01)

(52) U.S. Cl.
CPC ........ *H04W 4/021* (2013.01); *G01C 21/3461* (2013.01)

(58) Field of Classification Search
CPC .. G01C 21/34; G01C 21/3415; G01C 21/343;
G06F 17/30241; G06F 17/30327; G06F 17/30333; B06Q 10/047; B06Q 10/0631; G08G 1/096816; G08G 1/096844
USPC ....... 701/426, 117, 418, 408, 409, 532, 533;
707/999.101, 999.104; 340/995.1, 340/995.18; 342/357.34
See application file for complete search history.

(56) References Cited

U.S. PATENT DOCUMENTS

| | | | | |
|---|---|---|---|---|
| 6,507,850 B1 * | 1/2003 | Livshutz | ............. | G01C 21/32 701/461 |
| 2011/0251789 A1 * | 10/2011 | Sanders | ............. | G06Q 10/08 701/533 |
| 2013/0345969 A1 * | 12/2013 | Udeshi | ............. | G01C 21/30 701/461 |
| 2015/0338224 A1 * | 11/2015 | Geisberger | ......... | G01C 21/3446 701/527 |

* cited by examiner

Primary Examiner — Dalena Tran

(57) ABSTRACT

A method and system for creating Bounded Geographic Regions ("BGRs") in a navigation system using BGRs is presented. Various methods for creating BGRs are disclosed. Additionally, the implications of minimizing the area of a BGR is discussed and disclosed. The method and system allows for easier convergence for creation of BGRs.

24 Claims, 15 Drawing Sheets

METHOD AND SYSTEM FOR IMPLEMENTING NAVIGATION USING BOUNDED GEOGRAPHIC REGIONS

FIELD OF INVENTION

This invention relates to the field of navigation route calculation and guidance, including hand-held navigation, in-vehicle navigation, server-based navigation, and cell-phone application-related navigation.

BACKGROUND OF INVENTION

Information on the Background of this invention can be found in U.S. Utility Pat. No. 8,868,332, METHOD AND SYSTEM FOR NAVIGATION USING BOUNDED GEOGRAPHIC REGIONS; and U.S. Pat. No. 8,775,059, METHOD AND SYSTEM FOR MULTI-VEHICLE, MULTI-DESTINATION ROUTING. This patent application will refrain from repeating the adequate Background described in its predecessor patents.

Navigation kernels which pre-existed the use of Bounded Geographic Regions ("BGRs") had several performance deficiencies, namely inaccurate estimated time of arrival ("ETA"), and sub-optimum routing. A navigation kernel using BGRs can overcome many of these deficiencies, as described in the two above referenced patents.

However, the brute-force implementation of a navigation and guidance system using Bounded Geographic Regions ("BGRs") is both labor-intensive and time-consuming. Specifically, the proper set-up of the BGRs with respect to a mapping database can be both labor-intensive and time-consuming. The relevant portions of a map database have to be partitioned into BGRs of roughly equal mean area, with an average, white, and Gaussian distribution about the mean. The BGRs need roughly equal aspect ratios, with any variance being average, white, and Gaussian about the mean. In practice, these first two requirements cause problems, because the curvature of the Earth causes variation of either the aspect ratio or the area.

Furthermore, an explicit solution is not necessarily guaranteed in attempting to simultaneously create BGRs over a very large region. This problem is caused because trying to overlay BGRs onto a large geographic region creates a very large number of degrees of freedom. Due to the large number of degrees of freedom, not all solutions converge on a set of acceptable BGRs. In other words, using a brute force method to try and overlay the Earth with BGRs can lead to repeated unacceptable solutions. Although a computer can be compiled with an adequate instruction set to keep searching until an acceptable solution is found, it can take a significant amount of time (days, weeks, or months, depending on the processing power employed).

The scale and scope of partitioning the Earth causes this problem, with BGRs of a reasonable area numbering easily into the millions or tens-of-millions. The problems can lead to either repeated unacceptable solutions, or to an inordinately long processing time. A set of techniques to minimize the burden of generating BGRs is needed.

SUMMARY OF THE INVENTION

Like most navigation systems, this one includes input/output devices with user interfaces, a method for geo-locating (e.g., a GPS antennae and chip-set), a server-based navigation database, end-user processor(s) and memory, server-based processor(s) and memory, a wireless method for communicating between the end-user and server, and a navigation software core ("Navigation Kernel").

Like many systems, the user will input a destination, using either points-of-interest ("POI"), an address, or memory. The origin is assumed to be the current location of the user, unless some other point is specified. The user may specify shortest time, shortest distance, user defined cost functions (such as least gas), or exclusions (e.g., no interstates or no toll roads). To get from the origin to the destination, the invention will calculate a navigation solution.

It is possible, on the surface of the Earth, or on any abstraction representing a portion of the surface of the Earth, to create bounded geographic regions ("BGRs") in any localized area in which a user wants the assistance of a navigation device. A BGR is an imaginary construct, which creates a border around a given geographic region. In order to overlay a large region, like a city, state or country, many BGRs are needed. Within each BGR there will be a plurality of streets and POIs. On the periphery of the BGR, there will be nodes, representing the intersection of streets with the boundaries of the BGR.

When navigating within a BGR, there are only four possibilities: (1) the user enters the BGR at one node, and exits the BGR through another node; (2) the user originates a trip within the BGR and exits the BGR through a node; (3) the user enters the BGR through a node and the destination resides within the BGR; or (4) the origin and destination both reside within the BGR. In case 2, the origin will be treated as a node for calculation purposes. In case 3, the destination will be treated as a node for calculation purposes. In case 4, both the origin and destination will be treated as a node for calculation purposes. Therefore, in every BGR, it is possible to identify a finite number of Node Pairs, representing the total possible solution set for traversing the BGR.

Within each BGR, an explicit solution can be calculated between a given entry node and a given exit node. An explicit solution is one that examines all non-recursive paths between an entry point and an exit point, without use of a weighting function. A navigation or guidance solution is created by determining the node sequence that will minimize the cost function (time, distance, gas, etc.).

Several practical features of the Earth, map databases, and computer memory can be used to reduce the burden for generating BGRs. First, much of the land-surface of the Earth does not contain any navigable roads. There are wide swaths of land in almost every country with no roads. This is attributable to farms, forests, mountains, deserts, ravines or gorges, and variations in population density. These large areas of land with no navigable roads can be used to facilitate BGR generation and layout.

We define a degenerate BGR as one with zero or one nodes. A regular BGR is one with two or more nodes. By allowing degenerate BGRs to take on any area or aspect ratio, the calculation burden required to make the remaining BGRs have average area and aspect ratio with small variance becomes a much easier task. This allows the processor used for the task to solve the problem much more quickly.

Some additional techniques also help with creating suitable BGRs. For example, simultaneously creating BGRs over a very large geographic region can present an almost insurmountable problem for even the quickest modern processor. We call any area with contiguous regular BGRs an area of interest. BGRs can be separately created for each area of interest. It is then a much simpler task to knit or attach these areas of interest together, using degenerate BGRs, rather than trying to simultaneously solve for all areas of interest. In this way, the process can be speeded up substantially, and an explicit solution is guaranteed.

Another technique which helps create suitable BGRs is the use of equally spaced latitude lines. If we allow equally spaced latitude lines to act as two of the boundaries for each BGR, we reduce the degrees of freedom in the problem.

Another method for simplifying BGR generation is to start along the shoreline of a body of water. The body of water can be an ocean, sea, river, or lake. From a practicality standpoint, the body of water should be much larger than the average area of a regular BGR. This allows multiple BGRs to be aligned along the shoreline without any undesirable artifacts. As a minimum, the body of water should be at least four (4) times the average area of the regular BGR. This guarantees that at least eight (8) BGRs touch the body of water, making it easier to generate BGRs with a minimum of variance with respect to their area and aspect ratio.

Another simplifying method is to focus regular BGR generation on the corners of the BGR. After the first BGR is created in an area of interest, adjacent BGRs often only need one (1) or two (2) corners to be defined. This reduces the overall degrees of freedom for the BGR solution set within an area of interest, allowing for faster computation time and increasing the odds that a given attempt is convergent on an acceptable solution.

To improve navigation using BGR techniques, it is desirable that the edges or frames of regular BGRs be a given distance from any traffic control device (light, stop sign, etc.). The Exclusionary Distance is defined as the minimum distance that a regular BGR frame must be displaced from a traffic control device. In order to facilitate use of the Exclusionary Distance, the BGRs need not have linear frames. The frame edges of a BGR can be lines, polylines, splines, curves, polygons, or any other shape that inscribes the required area.

An additional consideration when creating a BGR system is the naming convention for both the BGRs and the nodes. Each BGR and node needs to have a unique identifier, so that it may be correctly identified. In order to create an efficient Node-Pair Look-up Table ("NPLUT"), an intelligent naming convention for both BGRs and nodes ought to be used. An intelligent naming convention is one in which some of the logic pertaining to the BGRs and nodes is contained in the name. For example, the BGR identifiers can include information such as the latitude and longitude of a particular corner, the latitude and longitude of its centroid, or the adjacent BGRs. Constructing a naming convention which uses both the physical location of the BGR, as well as its adjacent neighbors allows for several database operations to be performed more efficiently during run time.

Likewise, nodes need to have a unique identifier. The most helpful intelligent naming convention for nodes is one in which both adjacent BGRs are identified. This allows a database query to quickly identify nodes of interest by merely looking at the node identifiers. Additionally, it is helpful to use linked lists to track physical relationships between nodes and BGRs and between various node pairs. For example, a linked list function can be used that matches each node with potential exit nodes from both BGRs that the node of interest touches. Using this type of pointer will allow for faster pairing of potential solutions during guidance solving.

In order to account for local driving rules or conditions, we define a super BGR. A super BGR is a set of contiguous regular BGRs. A super BGR set can be used to identify and account for local conditions, such as a Michigan left turn (a left turn made by passing the intersection, turning left onto the same road, heading in the opposite direction, and then taking a right hand turn at the intersection of interest) or a Pennsylvania merge (a stop sign on the merge lane of a highway or interstate). These local traffic laws can affect ETA and other cost functions.

The use of a NPLUT captures the historical traffic flow within each regular BGR in an area of interest. As a result, the average speed and instantaneous speed, versus time, is captured as a natural function of prior navigation and guidance. The historical traffic flow data can be used to predict more accurate values for average speed and instantaneous speed, versus time, between any two nodes. As a result, the BGR system learns quickly how to adjust the ETA and other cost functions related to speed, as they vary in a predictable, time-dependent fashion.

Since the cost function is varying in a predictable, time-dependent fashion, the traffic flow within each BGR can be represented as longitudinal eigenmode. This allows for modeling and data analysis using well-recognized modal methodologies, such as time-varying impedance, resonance, and quality factor. In this way, it is easy to identify geographic points that provide the biggest cost-function variance at a given time of day. To improve accuracy, the navigation kernel would avoid such geographic points of great variance, because these geographic points (e.g., a particular intersection at a particular time of day) are unpredictable, the system could route around them. Additionally, impedance can be related to the cost function. For example, impedance can be calculated with respect to time-of-arrival and time-of-day, speed and time-of-day, or fuel usage and time-of-day. As a result, impedance can be used as a proxy for the cost-function. By minimizing the overall impedance of a navigational guidance sequence, the system will be optimizing the cost-function Areas of interest, regular BGRs, super BGRs, and historical traffic flow can be combined to create predictable behavior in a region during a special event, such as a sporting event or concert. The special event can also be a relatively pedestrian, recurrent, event, such as a local high school letting out at the same time on every school day. The impact that the special event has on the historical traffic flow is necessarily included in the NPLUT. By selecting a geographically appropriate flag (a flag that is attached to a BGR, group of BGRs, or super BGR), the impact of the special event can be predicted and accounted for in future navigation or guidance requests.

The error in the BGR navigation and guidance methodology is small, much smaller than other similar navigation kernels. The error that is inherent in the BGR navigation and guidance methodology is proportional to area. Therefore, to improve the system performance, it is desirable to reduce the overall area of the average regular BGR, to improve accuracy and reduce overall error. In the limit, such a reduction in BGR size could be nothing more than a pixel or other point representation. Clearly, there is a trade-off between the database size (smaller BGRs lead to a larger NPLUT) and the BGR size. The optimum solution is dependent on the efficiency of database methods (so-called big data methods) and the processing power of the system processor. By correctly constructing the NPLUT, with appropriate BGR and node naming conventions, as discussed, infra, it is possible, after the BGR system has been up and running, to revise the system to smaller BGRs, by simply sub-dividing the existing BGRs. The data in the original NPLUT would then be easily mapable to a new NPLUT.

BRIEF DESCRIPTION OF THE DRAWINGS

There are seventeen (17) relevant drawings.

DETAILED DESCRIPTION OF THE PREFERRED EMBODIMENTS

This description is not meant to limit the invention, but rather to illustrate its general principles of operation. Examples are illustrated with the accompanying drawings.

In U.S. Utility Pat. No. 8,868,332, METHOD AND SYSTEM FOR NAVIGATION USING BOUNDED GEOGRAPHIC REGIONS; and U.S. Pat. No. 8,775,059, METHOD AND SYSTEM FOR MULTI-VEHICLE, MULTI-DESTINATION ROUTING, a system and method for navigation and multi-vehicle navigation, using BGRs, was disclosed.

Figure 1:
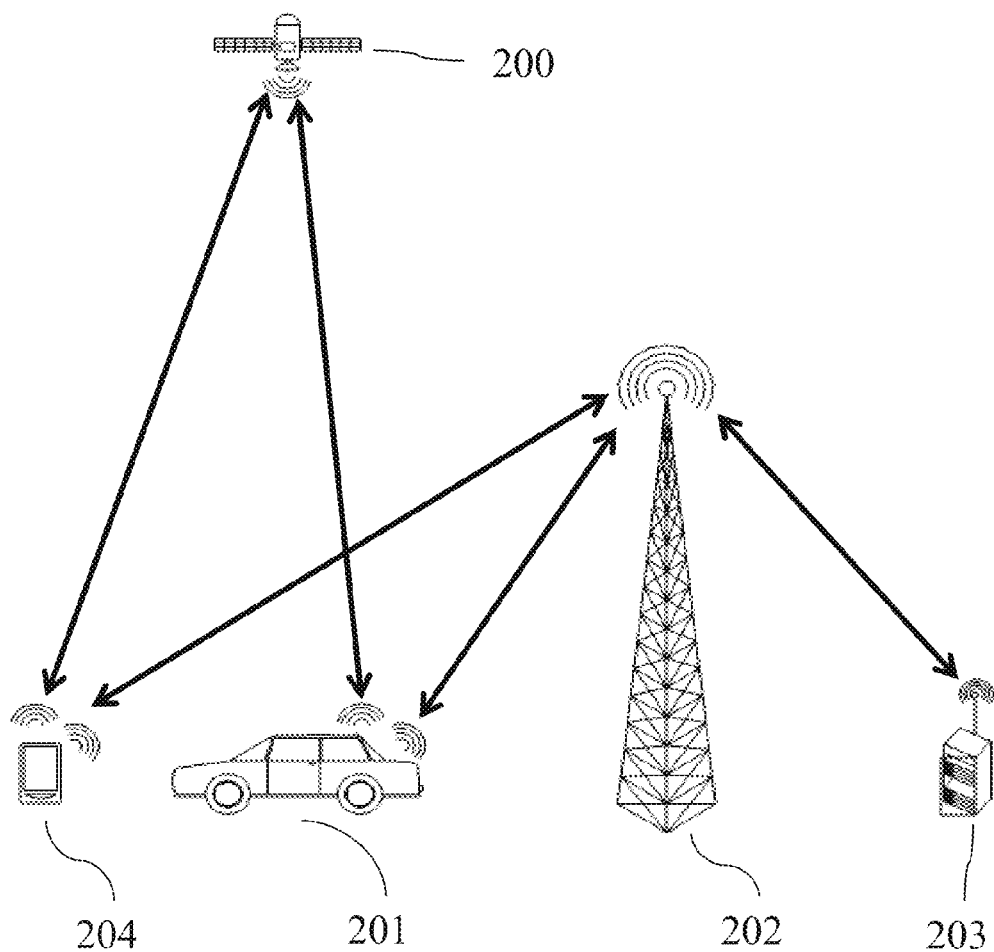
FIG. 1 is a system communication perspective drawing.

FIG. 1 shows an embodiment of wireless communication and geo-location, which is necessary for navigation. The end user is in a vehicle 201, which has a remote electronic device ("RED"), either built-in or mounted. The vehicle 201 geo-locates via a GPS chip-set, a gyro, and/or a satellite transceiver. A plurality of satellites 200 provides GPS signals to the vehicle's 201 GPS transceiver. The vehicle 201 is then able to communicate its location to a central server 203, using a wireless network 202. The wireless network 202 can be a cellular or mobile phone network, a radio-frequency network, or other wireless means. The transmission could also be made over a mixed means network, such as a wi-fi network that downloads and uploads requests to the server via a wired internet connection (not shown). Alternately, the navigation device can be a RED, mobile data terminal ("MDT") or cellphone 204. The cellphone, MDT, or RED 204, geo-locates via the satellite network 200. The cellphone, MDT, or RED 204, communicates with the server 203, via a wireless network 202.

Figure 17:
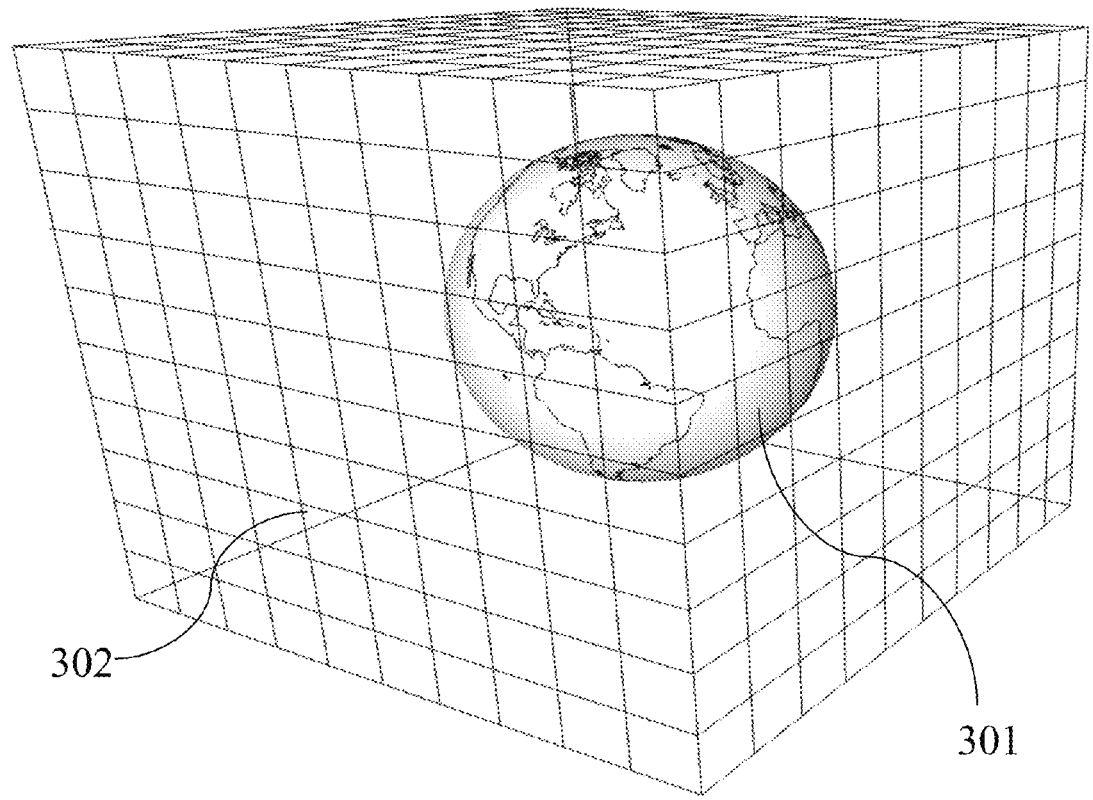
FIG. 17 shows a diagram of the idealized Earth inscribed in a simplified tessellated cube.

FIG. 17 shows the Earth 301 inscribed in a tessellated cube 302. On a computer, the virtual Earth 301 can be rotated or tilted until a geographic land mass of interest is centered. Under almost all circumstances, even though the Earth 301 is an oblate spheroid, the geographic region of interest can be made to be almost parallel with a face of the inscribing cube 302. By properly selecting the size of the tessellation on the cube 302, one can influence the size of the BGR projected onto the Earth 301. This method is called Virtual Tessellation, because the pattern on the Earth 301 is not technically a tessellation, because all of the BGRs will not be the same shape and size, and the Earth 301, itself, is not tessellated.

Figure 10:
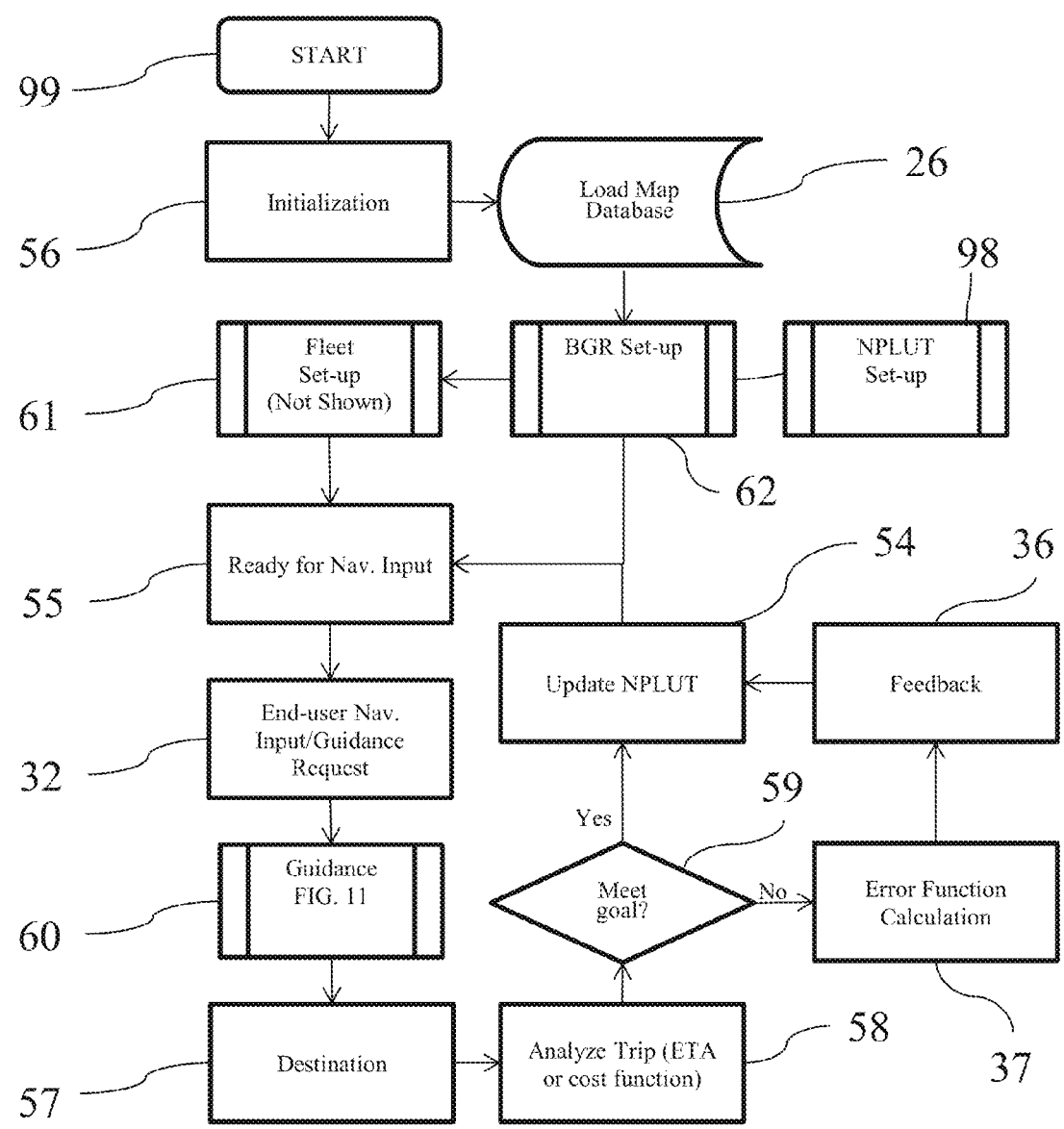
FIG. 10 is a simplified flowchart of the high-level system, including both set-up and navigation.

FIG. 10 shows a high level flow chart for the software method associated with navigation using BGRs. Some operations are only performed on set-up of operation: 99 initial START, 26 loading map database; 62 create BGRs through sub-routine, and 56 system initialization. The map database 26 can be purchased from any map database vendor, or a crowd-sourced map database can be used. The system initialization includes such administrative routines as forming the NPLUT 98, populating the NPLUT 98 with any available data, creating a user database, populating the user database with any available data, and similar tasks. Once the BGR routine 62 has occurred, Fleet Set-up Sub-Routine 61 (not shown) can occur, and then the system is ready for navigation 55. End User Nav Input Request 32 is received via a wireless means. The rest of the high-level system flowchart shows Guidance 60 (FIG. 11), followed by the user reaching the Destination 57. At the end of the trip, location vs. time data is analyzed for the trip 58. If the node-to-node trip segments are completed in a pre-defined amount of time, the trip met its goal 59, and the data is just added to the NPLUT 54. If the trip did not meet its goal 59, an error function calculation is performed 37, and the appropriate feedback 36 updates the NPLUT 54.

Figure 11:
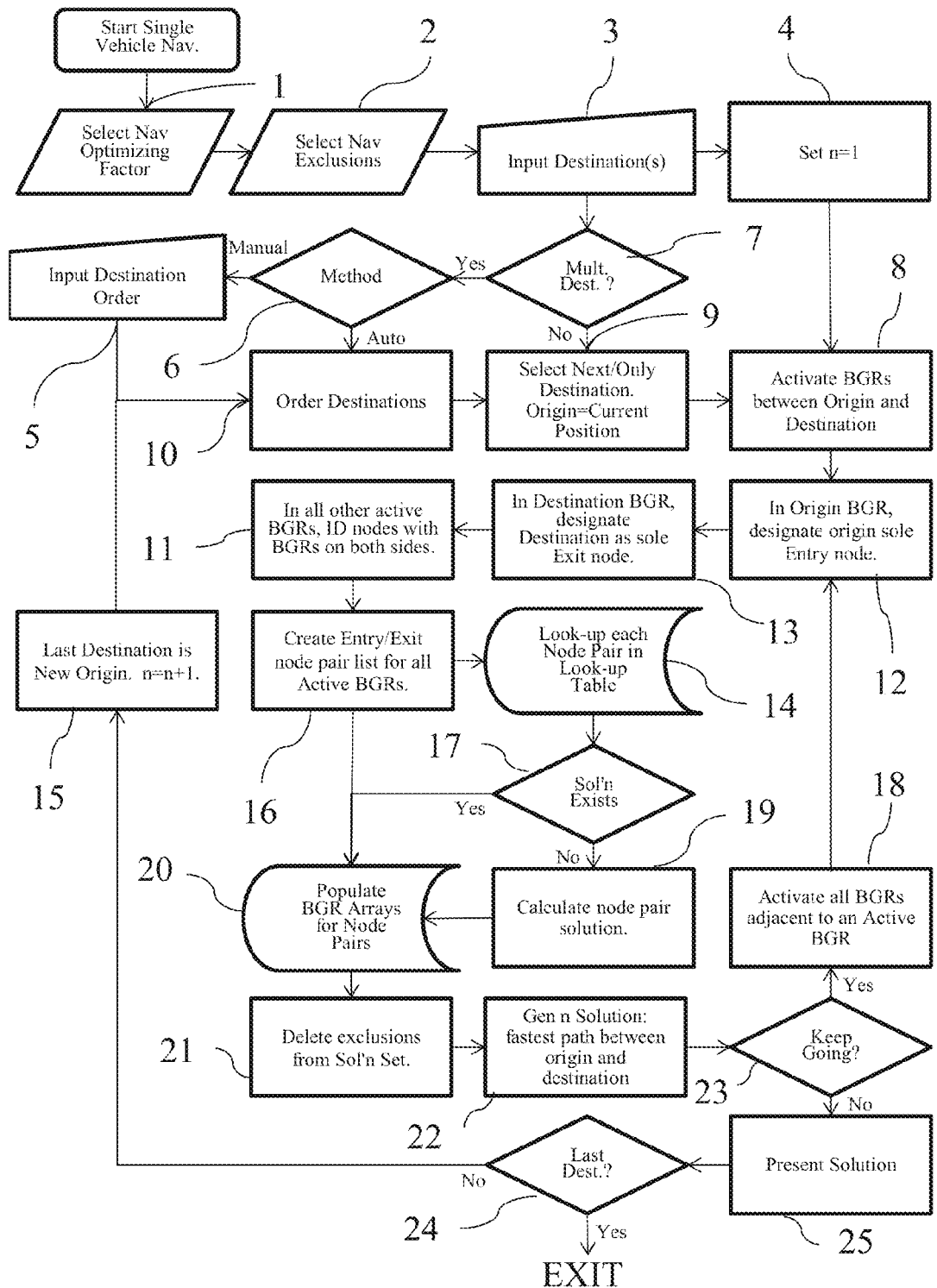
FIG. 11 is a flowchart of the navigation process.

FIG. 11 shows a flowchart of guidance using BGRs and nodes. The user selects Nav Optimizing Factors 1, Navigation Exclusions (e.g., roads to be avoided) 2, and the input destination 3. The system inputs whether it is a multi-destination or single destination guidance 7. If it is multiple destinations 7, the user gets to select 6 whether the order is set manually or automatically. If it is manual, the user inputs the destination order 5. If the ordering is automatic, the system orders the destinations 10. The system then properly orders origins and destinations, starting with the current position 9.

The nav kernel is initialized 4, with n=1, and BGRs are activated between the (first) origin and the destination 8. In the origin BGR, the origin is designated as an entry node 12. In the destination BGR, the destination is designated as the exit node 13. In all other BGRs, identify all nodes with BGRs on both sides 11. Create Entry/Exit node pair list for all active BGRs 16. Each node pair is looked up in the NPLUT 14. If a solution exists 17, the solution populates an array of possible solution node pairs through the BGRs 20.

If the solution does not exist 17, a node pair solution 19 is calculated. The initial node pair solution can be explicitly solved, or it can be solved using road weighting. Explicitly solving a node pair solution means calculated the expected time or other cost function for every route between two points. Using road weighting to create a node pair solution means assigning an expected speed to each road based on its road type, rather than being based on the roads speed limit. The method at arriving at the original node pair solution is immaterial, because a feedback function 37, 36 is performed to correct for error. This allows the BGRs to be treated as a statistical "black box."

After loading the solution into the BGR array 20, exclusions are deleted from the set 21. Exclusions may be roads not to travel on, or routes that take more than a pre-defined time standard to travel. The Gen n solution 22 is the fastest path found between the origin and destination out of this array. The solver has a decision criteria to decide if it keeps going 23 or presents the solution 25. If it keeps going 23, all BGRs that are adjacent to the active BGRs are activated 18. The method then loops back to designating the origin as an entry node 12. If the solution was presented 25, the solver either exits 24, presenting the solution, or it uses the last destination as the new origin for multi-destination 15. This method relies heavily on the BGRs and how they are formed. The claims in this patent application are concerned with the creation of BGRs 62, to enable the overall system.

Figure 8:
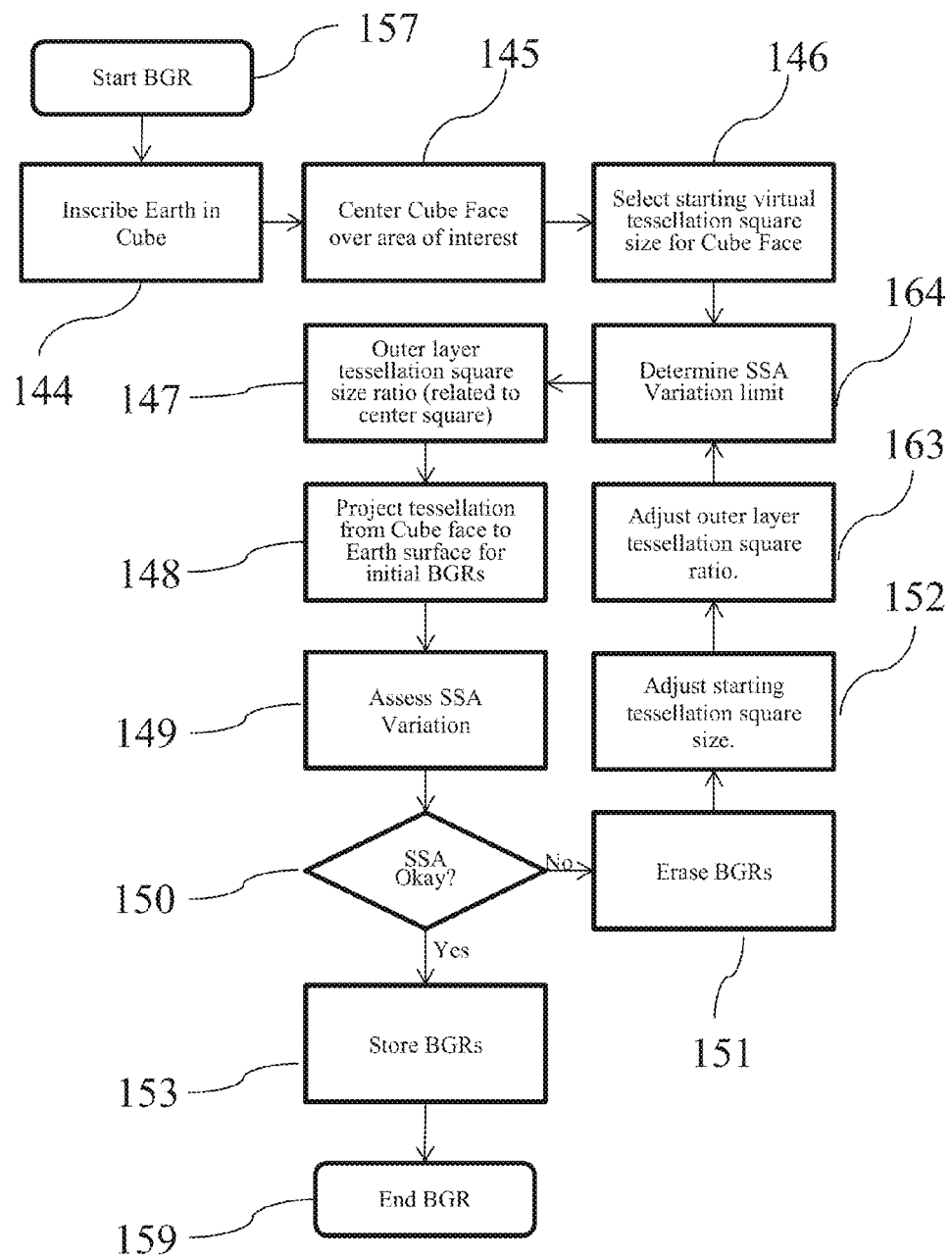
FIG. 8 shows a flowchart of a method for generating BGRs that was disclosed in the prior patents.
Figure 9:
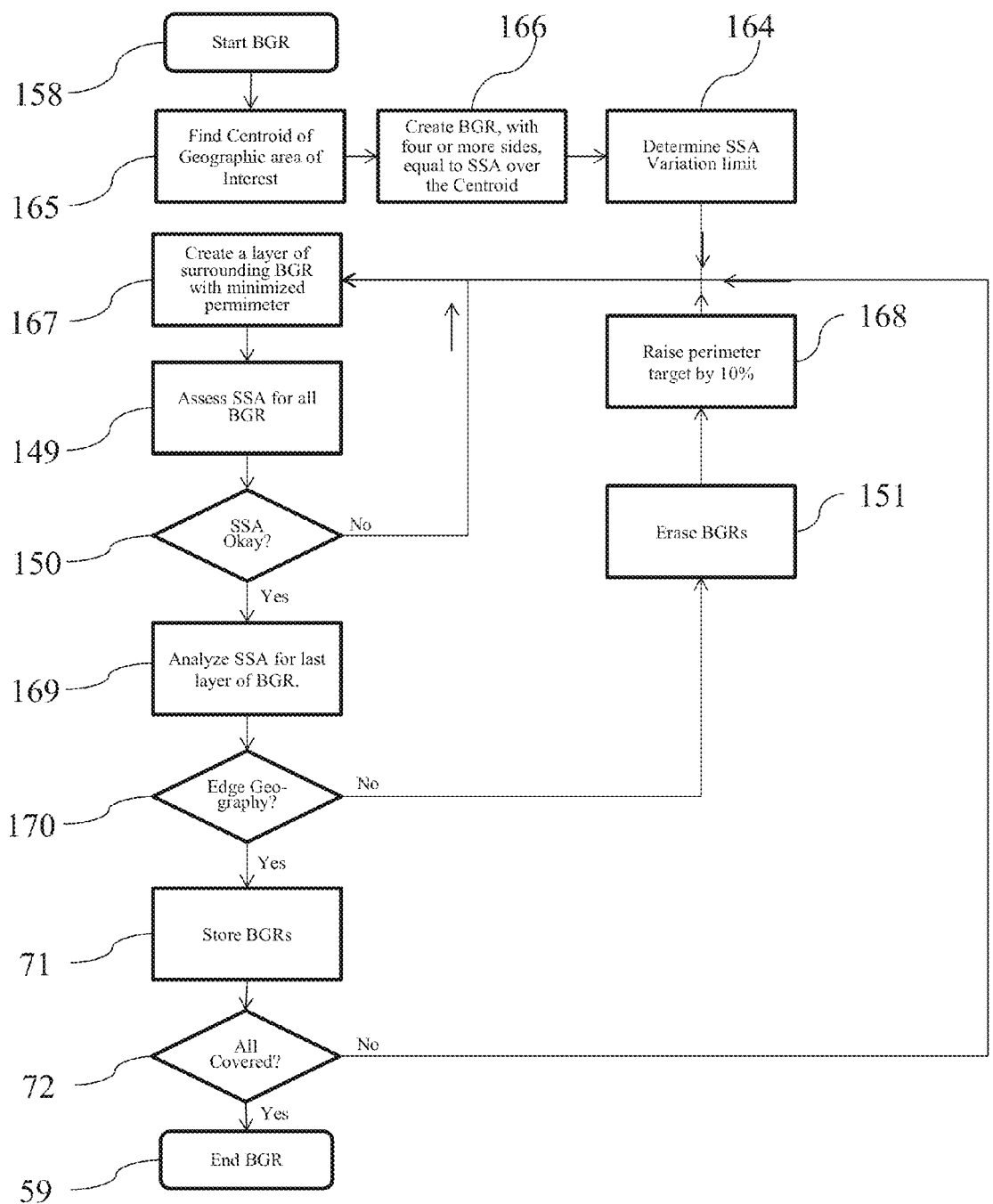
FIG. 9 shows an alternative embodiment of generating BGRs that was disclosed in the prior patents.

FIG. 8 and FIG. 9 show two methods of generating BGRs using Virtual Tessellation, given in U.S. Utility Pat. No. 8,868,332, METHOD AND SYSTEM FOR NAVIGATION USING BOUNDED GEOGRAPHIC REGIONS; and U.S. Pat. No. 8,775,059, METHOD AND SYSTEM FOR MULTI-VEHICLE, MULTI-DESTINATION ROUTING. They are repeated, here, for the sake of clarity, although they do have a new numbering scheme. Looking at FIG. 8, BGR sub-routine starts 157. The system inscribes the Earth 301 in a cube 144, 302. The center of the cube face 145 is centered over the geographic region of interest. A starting tessellation size 146 for the face of the cube is selected. The Standard Surface Area ("SSA") is the target surface area for the BGRs. A BGR SSA of approximately 1 sq. km seems ideal. Next, the variation limit for the SSA 164 is set. This number should be small (less than 10%). All BGRs should have a surface area very close to the SSA in order to minimize the potential for confounded data (non-orthogonal independent variables during an analysis of variance). If desired, the size of the tessellation squares 147 on the inscribing cube can be varied. Although this is computationally more difficult, it will minimize SSA variation (only the inner most piece is a square, with each proceeding layer being rectangles with higher and higher aspect ratios. The cube tessellation is projected onto the Earth 148 to create initial BGRs. The SSA of all BGRs is assessed 149. If the SSA analysis is okay 150, the BGRs are stored 153, and the BGR generation process ends 159. If the SSA analysis is not okay 150, all the BGRs are erased 151. Next, the system adjusts the starting tessellation size 152, the outer layer tessellation ratio (how quickly the outer layers of the tessellated cube face become rectangles of higher and higher aspect ratio) is adjusted 163, and adjust the SSA variation limit 164. The whole tiling process is then started again 147.

FIG. 9 shows a flow chart for an alternative embodiment for generating BGRs. The process is started 158 by finding the centroid of the geographic region of interest 165. A single BGR is created 166 with a surface area equal to the SSA and at least four sides. The SSA variation limit is set 164. A layer of BGRs is created around the existing BGR(s), in which the new layer of BGRs has its perimeter minimized 167. The SSA for the layer is analyzed 149. As long as the SSA analysis is okay, additional layers of BGRs are added. If the SSA is not okay 150, the SSA for just the last layer is analyzed 169. If the last layer includes BGRs which overlap the border of the geographic region of interest 170, and that is the sole cause of the unacceptable SSA, the BGRs are stored 171. If it is not edge geography 170, the last layer of BGRs is erased 151. The allowable maximum perimeter will be increased by 10% from the previous iteration 168, and a new layer of BGRs will be created 167. The process continues until the entire geographic region of interest is covered with BGRs 172, and then the sub-routine Ends 159.

Figure 2A:
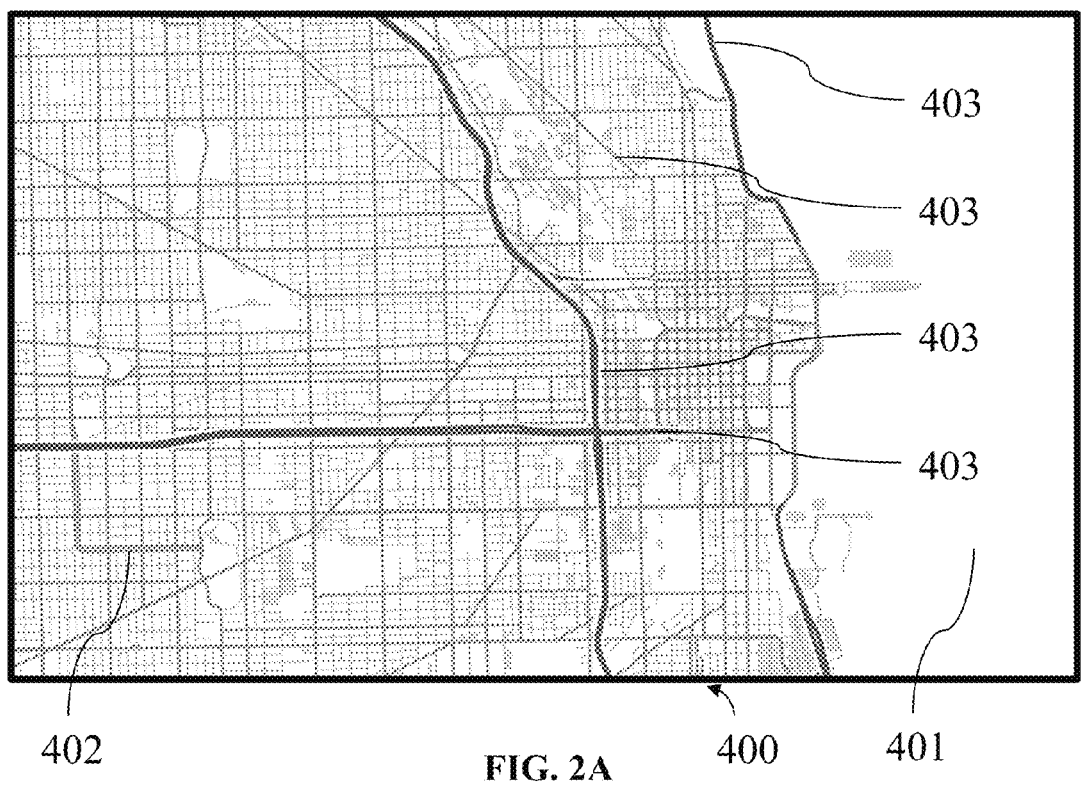
FIGS. 2A, 2B, 3A, 3B, 4, 5, 6 and 7 are maps overlayed with constructs to form BGRs.

FIG. 2A shows a map of an Area of Interest 400. For the purposes of this patent, Physical Attributes are lakes, rivers, oceans, seas, mountains, forests, or other natural or man-made features that are larger than the Standard Surface Area ("SSA") in the Area of Interest. FIG. 2A has a Physical Attribute, a lake 401, as well as land 402 with a plurality of roads 403.

Figure 12A:
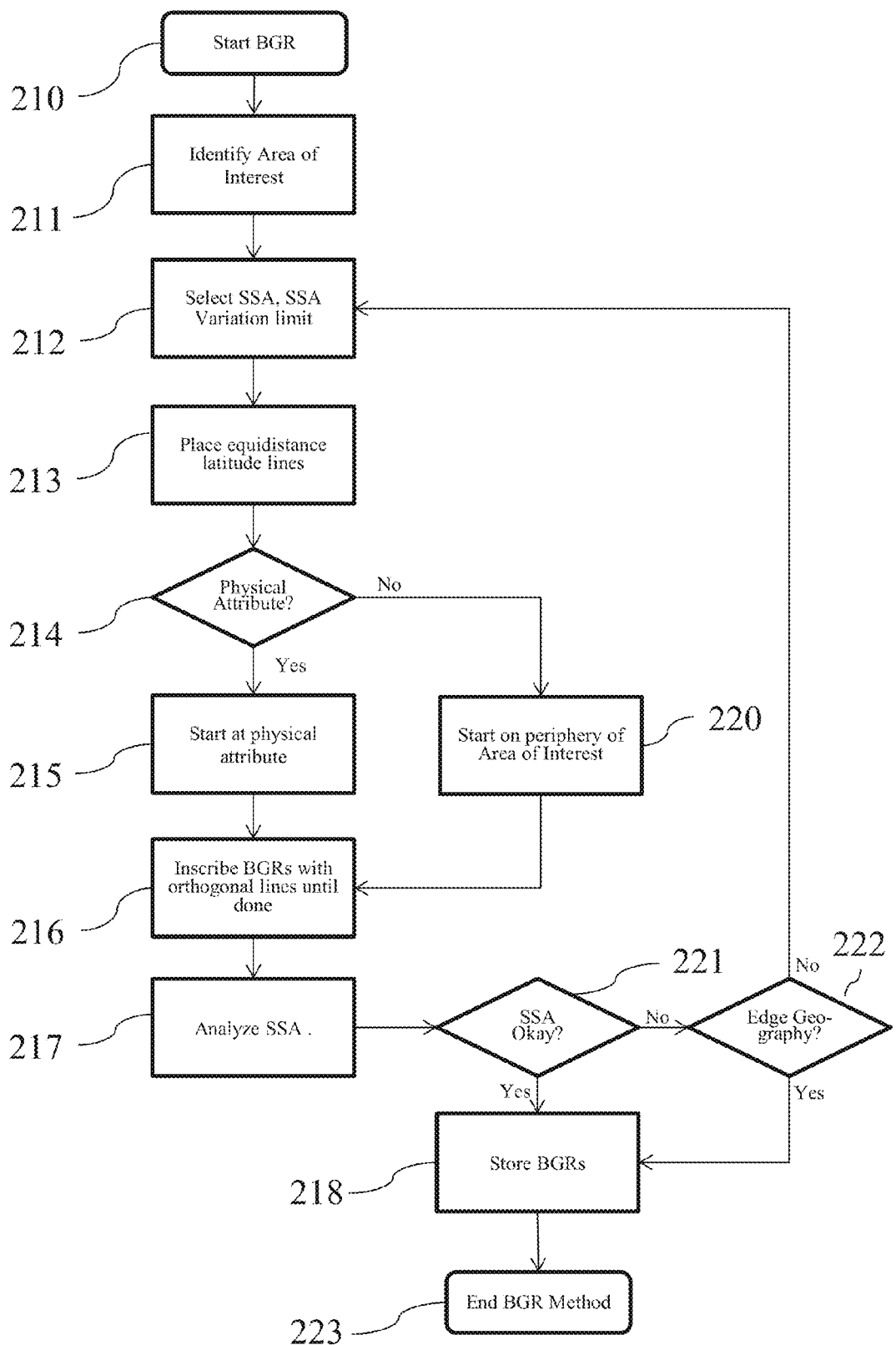
FIGS. 12A, 12B, and 12C are flowcharts documenting new alternative embodiments for generating BGR.

FIG. 12A shows a flow chart for an alternative embodiment for generating BGRs. The routine is started 210 by defining or identifying an Area of Interest 211. A BGR SSA and SSA variation limit are chosen 212. Based on the SSA, equidistant latitude lines 213 are superimposed over the area of interest. If a physical attribute is present 214, the BGR process moves to the edge of the physical attribute 215, otherwise, the BGR process starts on the periphery of the Area of Interest 220. Orthogonal or nearly orthogonal lines 216 are drawn between adjacent latitude lines to inscribe a BGR with the appropriate SSA. When the Area of Interest has been tiled with BGRs, the SSA of the BGRs is analyzed 217. If the SSA and SSA variation is okay 221, the BGR results are stored 218. If the SSA and SSA variation are not okay 221, the SSA are analyzed to determine if the non-conforming results are solely the results of BGRs on the edge of the Area of Interest 222. If the non-conforming results is soley due to edge BGRs 222, the BGR results are stored 218. Otherwise 222, the sub-routine loops back to adjust the SSA and SSA variation 212. When BGRs of suitable SSA and SSA variation 212, 217, 221 have been achieved, the sub-routine Ends 223.

Figure 2B:
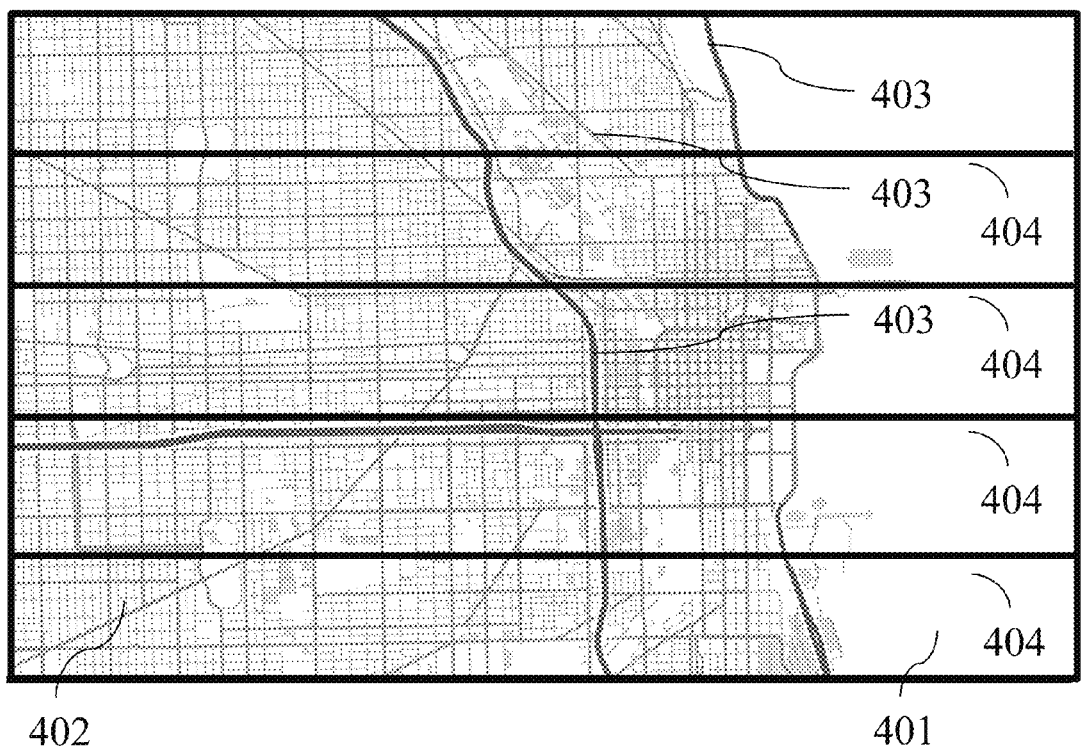
Figure 3A:
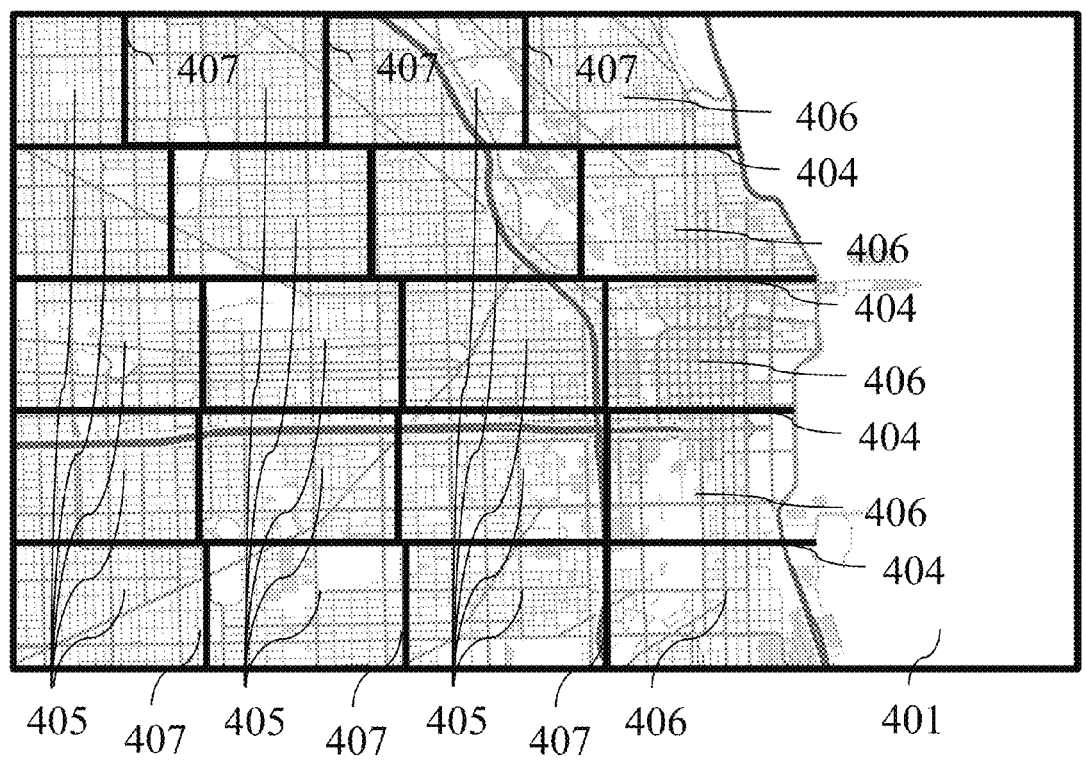

FIG. 2B shows a map with a Physical Attribute, a lake, 401, and land 402 with a plurality of roads. Superimposed on top are a plurality of equidistant latitude lines 404. FIG. 3A shows a plurality of orthogonal lines 407, which vertically connect the equidistant latitude lines 404, inscribing BGRs 405, 406. Some of the BGRs 405 are inscribed by two equidistant latitude lines 404 and two orthogonal, vertical lines 407. The BGRs next to the Physical Attribute 401 are inscribed by two equidistant latitude lines 404, one orthogonal, vertical line 407, and the Physical Attribute 401.

Figure 12B:
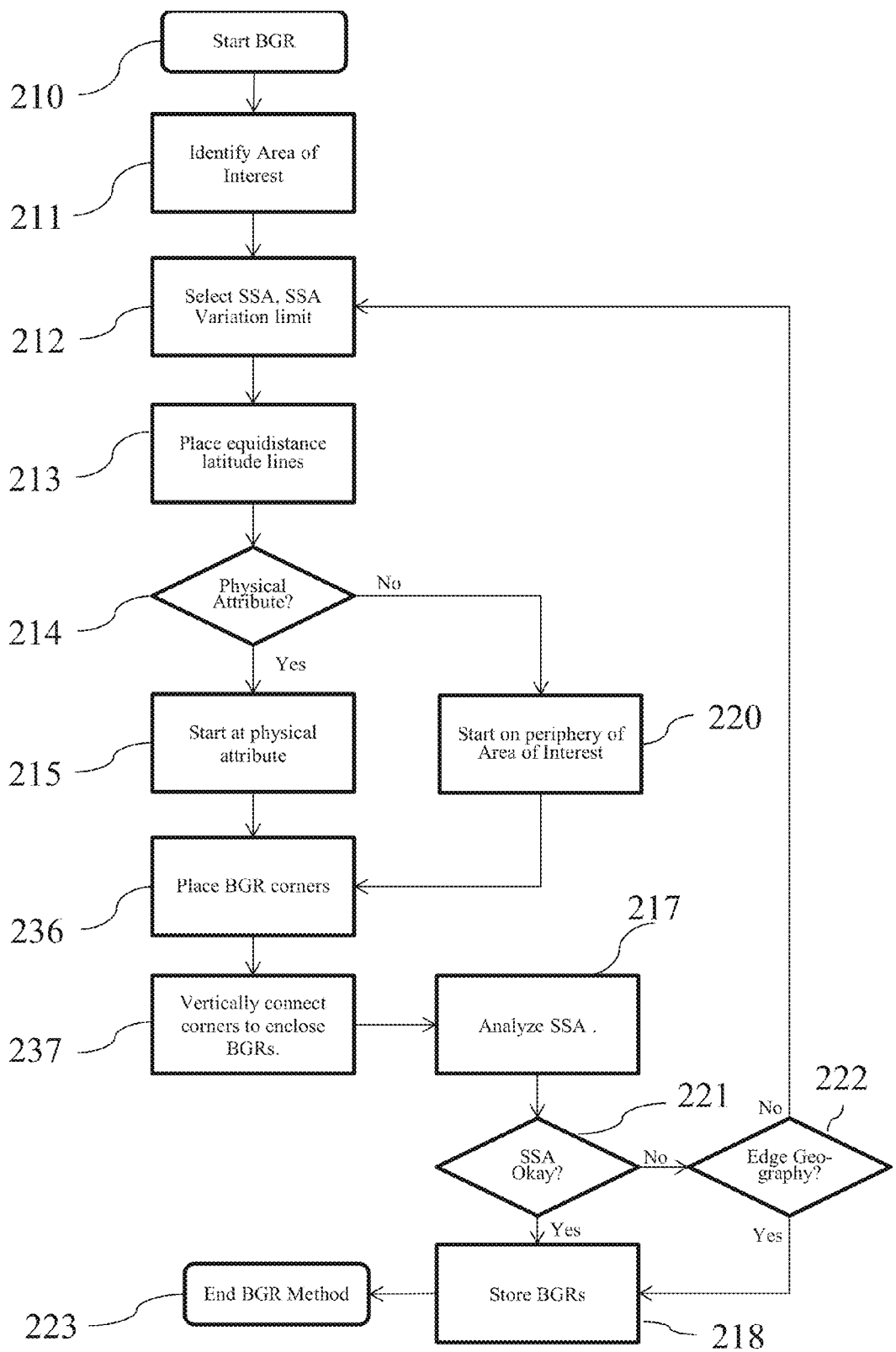

FIG. 12B shows a flow chart for an alternative embodiment for generating BGRs. The routine is started 210 by defining or identifying an Area of Interest 211. A BGR SSA and SSA variation limit are chosen 212. Based on the SSA, equidistant latitude lines 213 are superimposed over the area of interest. For the purposes of this patent, Physical Attributes are lakes, rivers, oceans, seas, mountains, forests, or other natural or man-made features that are larger than the SSA in the Area of Interest. If a physical attribute is present 214, the BGR process moves to the edge of the physical attribute 215, otherwise, the BGR process starts on the periphery of the Area of Interest 220. BGR corners are placed 236 on the equidistance latitude lines 213. The corners are vertically connected to enclose BGRs 237 between adjacent latitude lines to inscribe a BGR with the appropriate SSA. When the Area of Interest has been tiled with BGRs, the SSA of the BGRs is analyzed 217. If the SSA and SSA variation is okay 221, the BGR results are stored 218. If the SSA and SSA variation are not okay 221, the SSA are analyzed to determine if the non-conforming results are solely the results of BGRs on the edge of the Area of Interest 222. If the non-conforming results is soley due to edge BGRs 222, the BGR results are stored 218. Otherwise 222, the sub-routine loops back to adjust the SSA and SSA variation 212. When BGRs of suitable SSA and SSA variation 212, 217, 221 have been achieved, the sub-routine Ends 223.

Figure 3B:
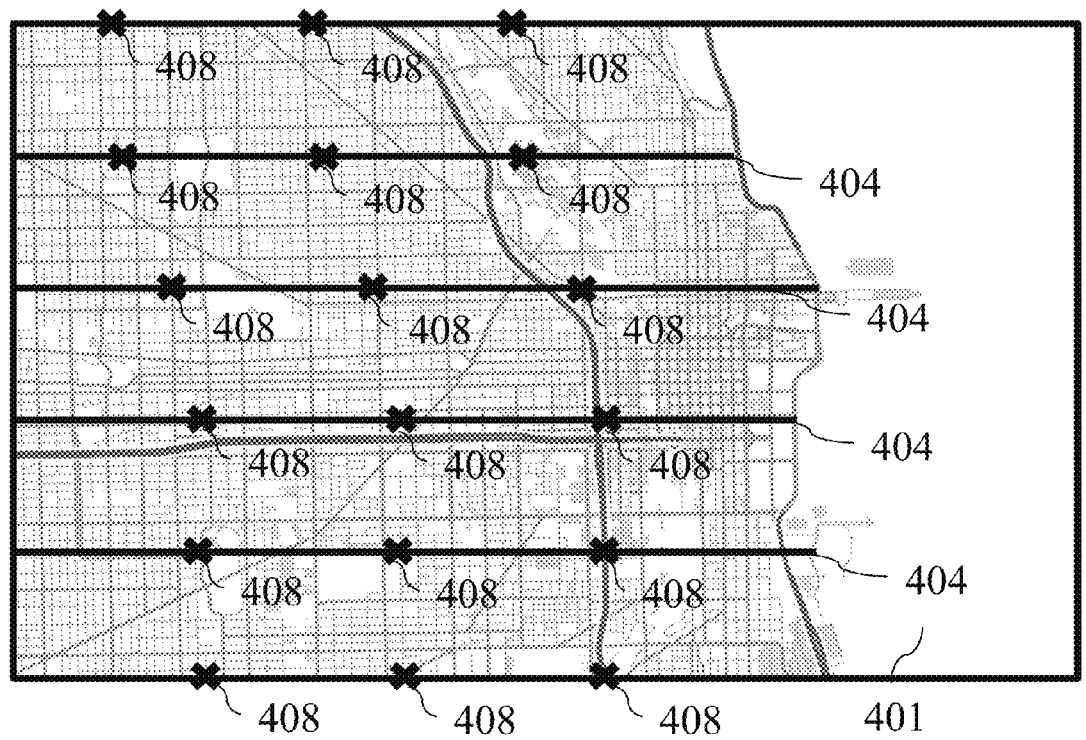
Figure 4:
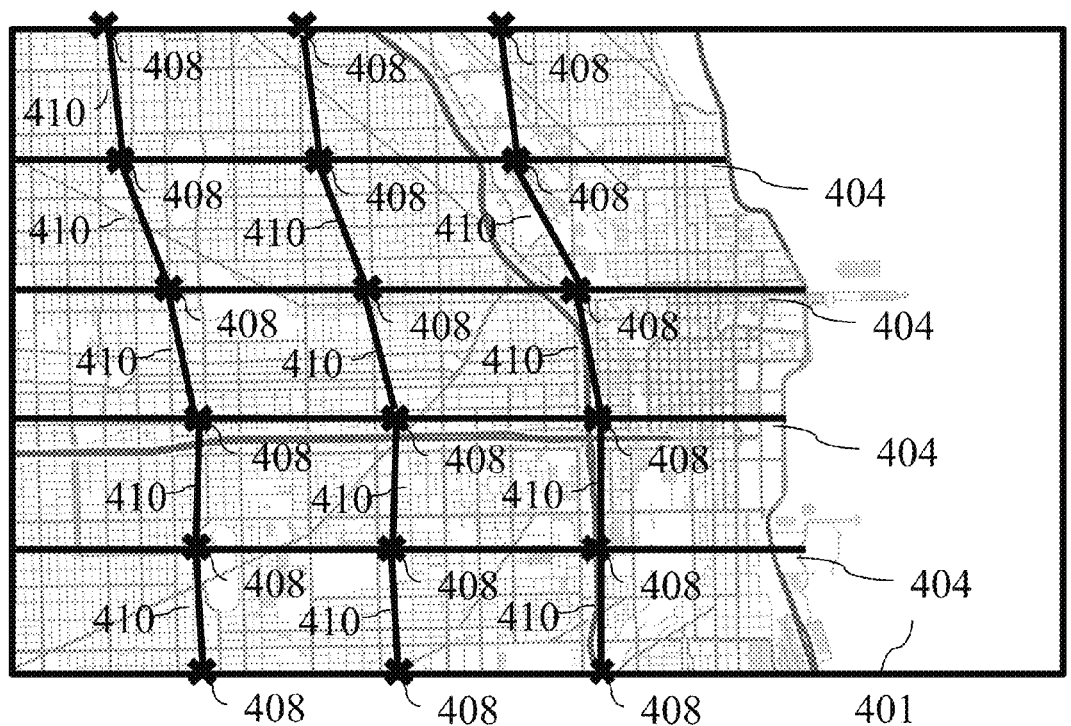

FIG. 3B shows an overlay of a plurality of equidistant latitude lines 404. BGR corners 408 have been selected by moving across the latitude lines 404 from the Physical Attribute 401. FIG. 4 shows that BGRs are inscribed by connecting BGR corners 408 with vertical connectors 410.

Figure 12C:
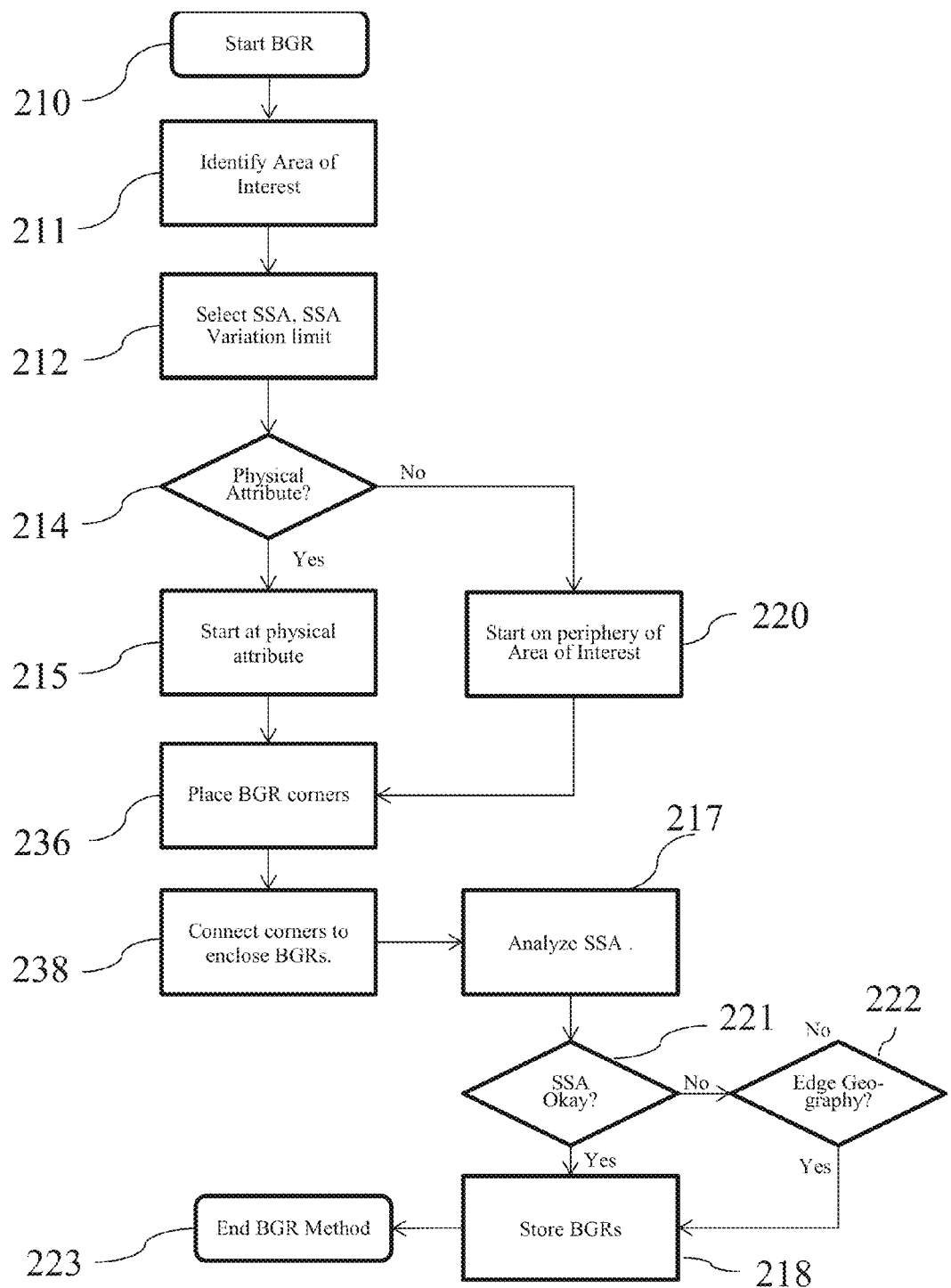

FIG. 12C shows a flow chart for an alternative embodiment for generating BGRs. The routine is started 210 by defining or identifying an Area of Interest 211. A BGR SSA and SSA variation limit are chosen 212. If a physical attribute is present 214, the BGR process moves to the edge of the physical attribute 215, otherwise, the BGR process starts on the periphery of the Area of Interest 220. BGR corners are placed 236, without reference to latitude lines. The corners are vertically and horizontally connected to enclose BGRs 238 between adjacent latitude lines to inscribe a BGR with the appropriate SSA. When the Area of Interest has been tiled with BGRs, the SSA of the BGRs is analyzed 217. If the SSA and SSA variation is okay 221, the BGR results are stored 218. If the SSA and SSA variation are not okay 221, the SSA are analyzed to determine if the non-conforming results are solely the results of BGRs on the edge of the Area of Interest 222. If the non-conforming results is soley due to edge BGRs 222, the BGR results are stored 218. Otherwise 222, the sub-routine loops back to adjust the SSA and SSA variation 212. When BGRs of suitable SSA and SSA variation 212, 217, 221 have been achieved, the sub-routine Ends 223.

Figure 5:
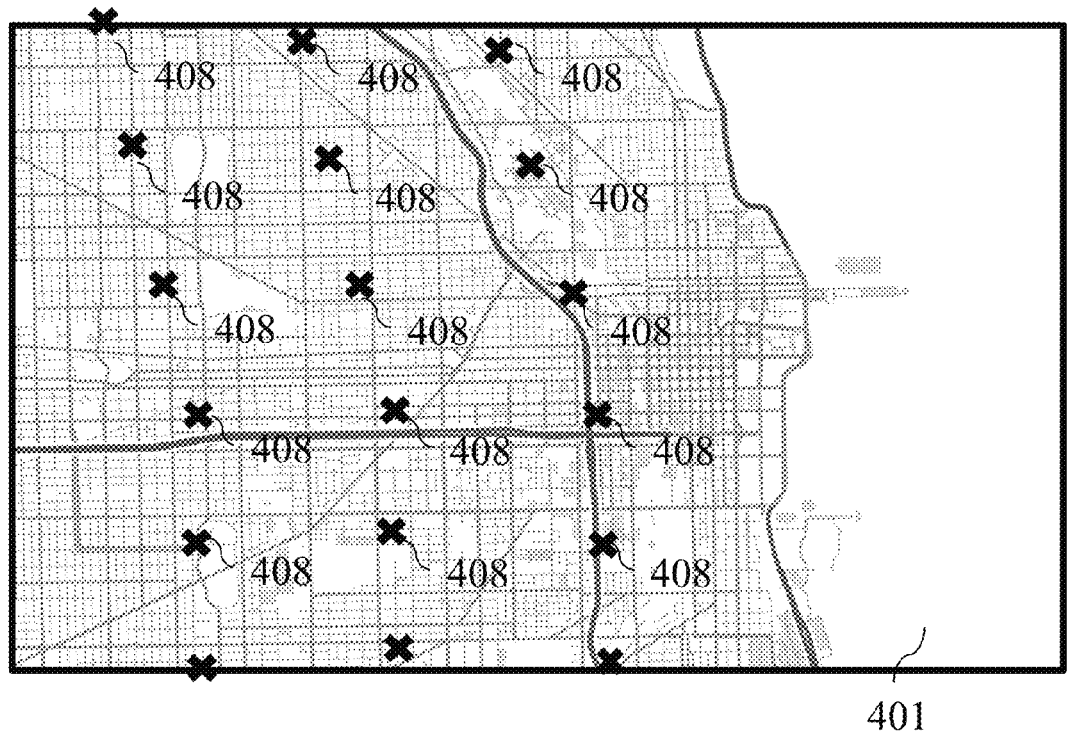
Figure 6:
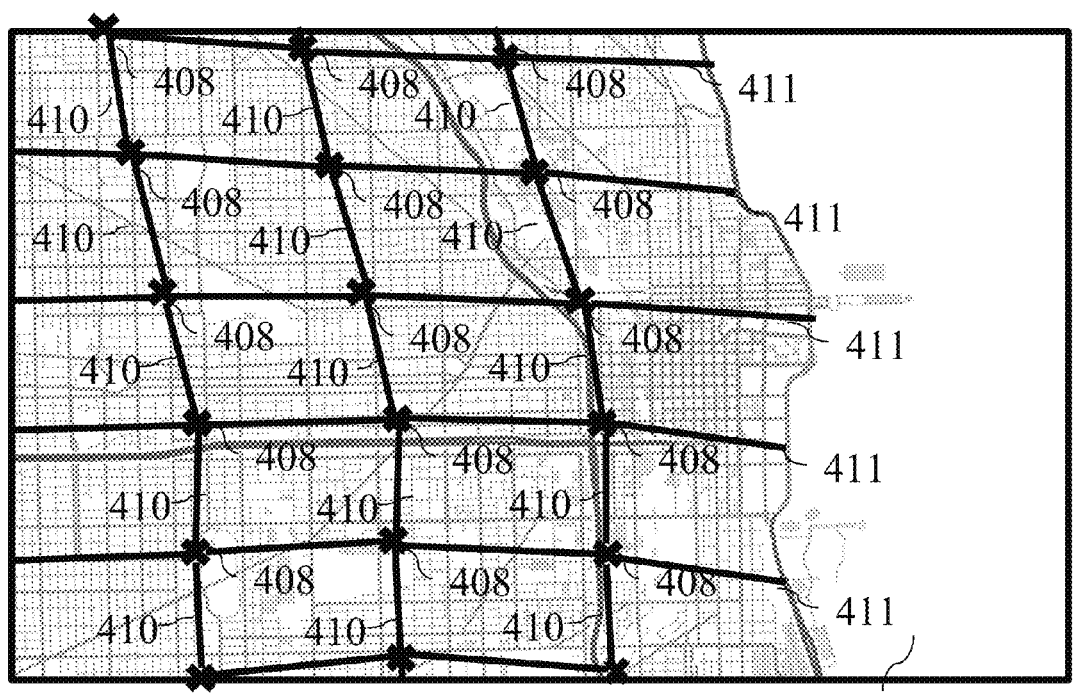
Figure 7:

FIG. 5 shows a plurality of BGR corners 408 placed on a map. The corners 408 were placed starting at the Physical Attribute 401. FIG. 6 shows that the BGR corners 408 are connected with both horizontal 410 and vertical 411 connectors. FIG. 7 shows the BGRs 420 with the corners 408 removed.

Figure 13:
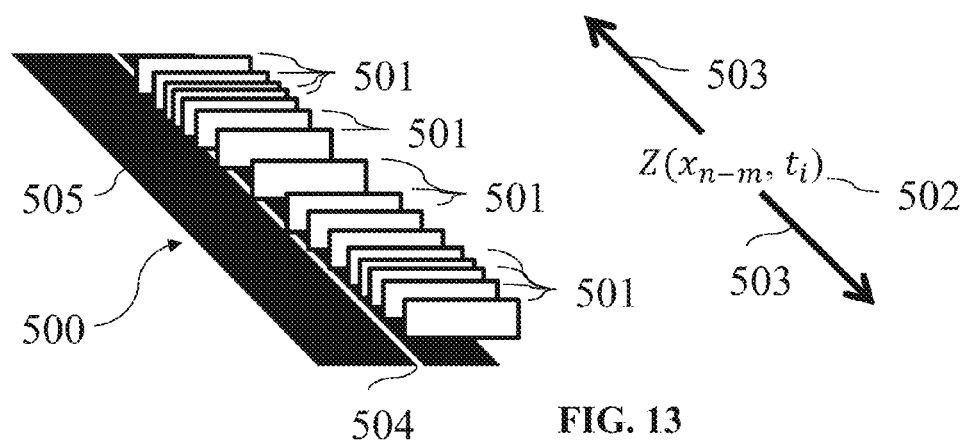
FIG. 13 shows a wavefront superimposed on a street segment, including the impedance function of the wave front.
Figure 14:
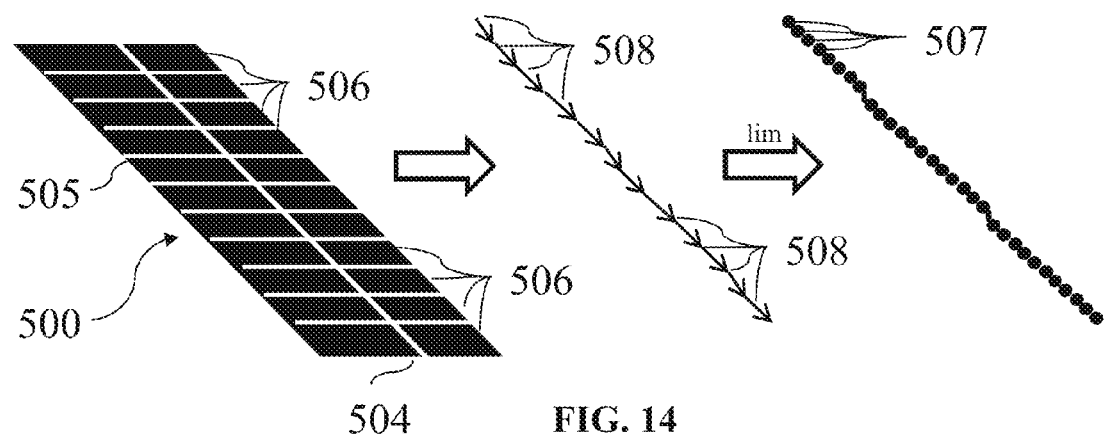
FIG. 14 shows the street divided into small segments, including the impedance function for each segment, represented by arrows.
Figure 15:
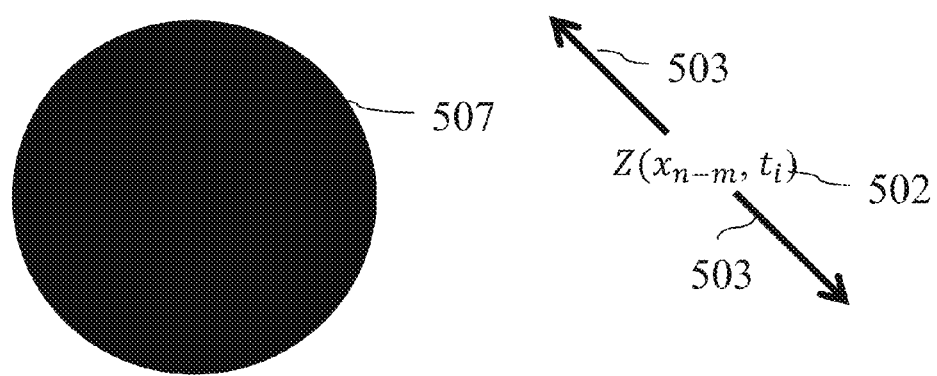
FIG. 15 shows a pixel, the limit of the reduction in the BGR size, which can be represented by an impedance function.

Within a single BGR, traffic behaves largely as a wavefront. FIG. 13 shows a roadway 500 with travel lanes 505 and a white line 504 down the center is shown. One can image a wavefront 501, providing impedance to the vehicle. The impedance traversing a BGR between two nodes 503 can be represented as a function of both position and time 502. FIG. 14 shows the roadway 500 divided into smaller BGRs 506, by adding intermediate boundaries 505. The white stripe 504 is still shown. The impedance of each BGR 505 can be represented by an impedance vector 508. As the roadway 500 is divided more and more, the surface become a pixel-train 507. FIG. 15 shows a single pixel 507, which, again, would have an impedance 502 associated across its length 503, no matter how small the pixel is. The BGR navigation methods disclosed in this patent, and in the prior two patents, can work with increasingly small BGRs. As BGRs shrink in size, the accuracy and resolution of the navigation system using BGRs will improve. In the limit, the entire road network would be composed of pixels, with each pixel represented by an impedance function. Except at intersection, there would be only a single entry node and a single exit mode. Under these conditions (pixel-sized BGRs), the calculation methods used in this and the prior two patents end up merely minimizing the impedance for a trip, although the methodology, itself, does not substantively change.

Figure 16A:
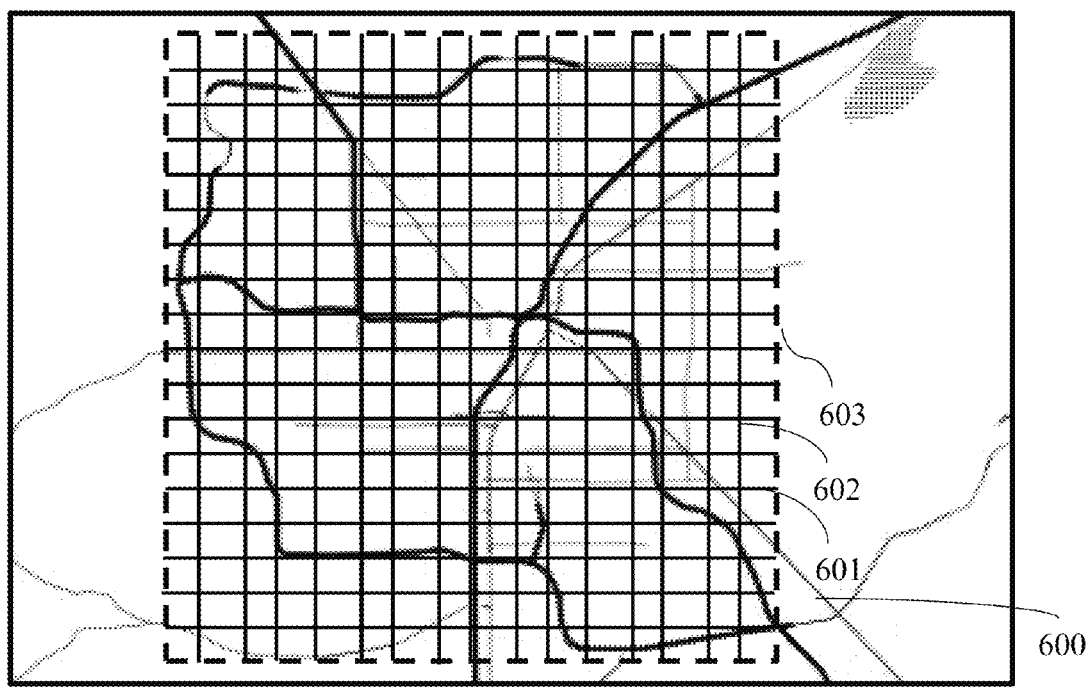
FIG. 16A shows BGRs overlaying an area of interest.
Figure 16B:
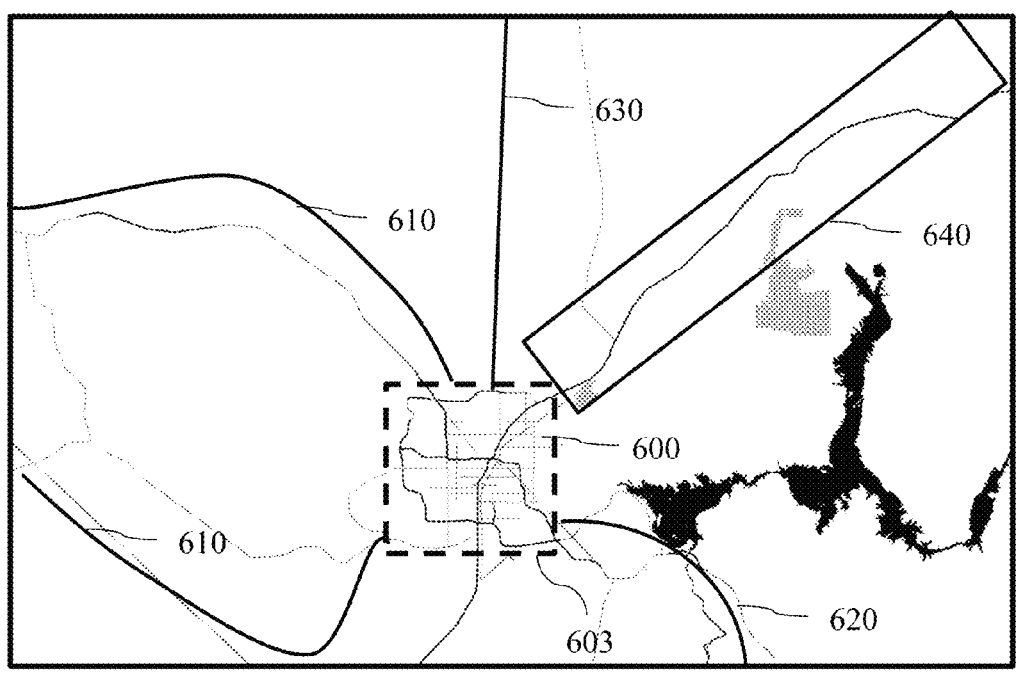
FIG. 16B shows that the area of interest can be a super-BGR.

FIG. 16A shows a super-BGR 600. The super-BGR 600 has a border 603. Within the super-BGR 600 are a plurality of regular BGRs composed from horizontal 601 and vertical 602 connectors. FIG. 16B shows that super BGR 600 in the context of a larger geographic area. The super-BGR 600 is a metropolitan region in the middle of nowhere. The border of the super-BGR 603 is in contact with a number of different kinds of curves and lines: splines 610, an arc 620, and a straight line 630. In vacant geographic regions, irregular BGRs can be formed by using a combination of splines 610, curves 620, and lines 630. The BGRs can be formed so that they follow a single, relatively straight road 640. The purpose of using various lines and curves and irregular BGRs is to allow Areas of Interest to have regular BGRs with as small of variation in SSA as possible.

We claim:

1. A method of implementing navigation guidance using Bounded Geographic Regions ("BGR"), containing, at a minimum, an end-user device with means for inputting destinations and receiving routing guidance;
   a map database, containing roads and, optionally, points of interest ("POIs");
   a Global Positioning System ("GPS") receiver determining vehicle position; an assemblage of memory and processing elements referred to as a server;
   a means for communicating between the end-user device and the server;
   a Node Pair Look-up Table ("NPLUT") database which is initially, either partially or fully, loaded with explicit solutions for the dependent variable for each Node Pair, and which contains explicit solutions between each potential entry node and each potential exit node of every BGR of interest to the end user, each BGR being an area bounded by a defined perimeter, wherein no BGRs overlap, and all areas of interest to the end user are included in a BGR; and
   wherein a node is the point at which a road segment intersects with a defined perimeter of a BGR;
   and a navigation software core, resident on the server, having the capability to create BGRs of such a size that explicit navigation solutions are possible within the boundaries of the BGR, to identify Node Pairs for each BGR which might be part of a potential solution, and to optimize a navigation solution based on the dependent variable provided by the user, said dependent variable being at least one of distance, time, fuel, or user-defined cost-function, and the independent variables which are inherently part of a solution database, said independent variables being at least a plurality of day of week, date, time of day, a unique driver identifier, and unique vehicle identifier;
   wherein BGRs are generated in the map database by first performing, on the server, at least one of
   projecting equidistant latitude lines across all said map database areas of interest, and
   identifying a plurality of corners of each said BGR.

2. The method of implementing navigation guidance using BGRs in claim 1, in which the BGRs are categorized as either degenerate or regular, with degenerate BGRs being defined as ones with either only a single node or no node, and regular BGRs being defined as ones with two or more nodes.

3. The method of implementing navigation guidance using BGRs in claim 2, in which the generation of BGRs is performed so as to minimize variance in the surface area of regular BGRs, by allowing degenerate BGRs to have varying areas, aspect ratios, sides, and shapes.

4. The method of implementing navigation guidance using BGRs in claim 3, in which generation of BGRs is performed separately for each of a plurality of areas of interest, with the BGRs for the plurality of said areas of interest being knitted or stitched together.

5. The method of implementing navigation guidance using BGRs in claim 4, in which said knitting or stitching together of the plurality of said areas of interest is performed through the use of degenerate BGRs.

6. The method of implementing navigation guidance using BGRs in claim 3, in which BGR generation is started along a shoreline of any body of water.

7. The method of implementing navigation guidance using BGRs in claim 6, in which said body of water is a pond, reservoir, lake, or sea that covers an area at least four (4) or more times the average area of the regular BGRs in the area of interest.

8. The method of implementing navigation guidance using BGRs in claim 1, in which frames edges, drawn by using lines, splines, curves, and polygons, connect said corners of said BGRs.

9. The method of implementing navigation guidance using BGRs in claim 8, in which BGRs are generated, using an Exclusionary Distance, said Exclusionary Distance being a linear distance that said BGR frame edges are from all traffic control devices and intersections.

10. The method of implementing navigation guidance using BGRs in claim 1, in which each BGR is identified by a unique alphanumeric, decimal, binary, or hexadecimal representation.

11. The method of implementing navigation guidance using BGRs in claim 10, in which each node is identified by a unique alphanumeric, decimal, binary, or hexadecimal representation.

12. The method of implementing navigation guidance using BGRs in claim 11, in which said unique representations of said nodes include a designator identifying the BGRs that said node touches.

13. The method of implementing navigation guidance using BGRs in claim 1, in which each node is stored as a linked list, with a pointer identifying each BGR which said node contacts.

14. The method of implementing navigation guidance using BGRs in claim 1, in which Super BGRs, composed of a plurality of BGRs, are used to track peculiar local traffic laws, driver customs, and other localized behavior that affect traffic flow.

15. The method of implementing navigation guidance using BGRs in claim 1, in which historical, time-dependent behavior of traffic within each said BGR, including traffic density, average speed, and instantaneous speed as a function of location between two nodes, is used to perform data analysis.

16. The method of implementing navigation guidance using BGRs in claim 15, in which said data analysis of historical, time-dependent behavior of traffic is used to predict future traffic patterns.

17. The method of implementing navigation guidance using BGRs in claim 16, in which the future traffic patterns relate to a special event or function, at which a large crowd of people gather.

18. The method of implementing navigation guidance using BGRs in claim 15, in which traffic within each said BGR is modeled as a longitudinal wave, creating within each said BGR an eigenmode with a 24 hour cycle.

19. The method of implementing navigation guidance using BGRs in claim 18, in which said traffic within each said BGR has a time-dependent impedance, resonance, and Quality factor.

20. The in claim 1, in which the average area of the BGRs is minimized to no more than 1000 sq. ft.

21. The method of implementing navigation guidance using BGRs in claim 20, in which traffic within each said BGR is modeled as a longitudinal wave, creating within each said BGR an eigenmode with a 24 hour cycle.

22. The method of implementing navigation guidance using BGRs in claim 21, in which the traffic within each said BGR has a time-dependent impedance, resonance, and Quality factor.

23. The method of implementing navigation guidance using BGRs in claim 1, in which the average area of the BGRs is minimized to a single pixel.

24. A system of implementing navigation guidance using BGRs, containing, at a minimum, an end-user device with means for inputting destinations and receiving routing guidance;
    a map database, containing roads and, optionally, points of interest ("POIs");
    a GPS receiver;
    a server;
    a means for communicating between the end-user device and the server;
    a Node Pair Look-up Table ("NPLUT") database which is initially, either partially or fully, loaded with explicit solutions for the dependent variable for each Node Pair, and which contains explicit solutions between each potential entry node and each potential exit node of every BGR of interest to the end user, each BGR being an area bounded by a defined perimeter, wherein no BGRs overlap, and all areas of interest to the end user are included in a BGR; and wherein a node is the point at which a road segment intersects with a defined perimeter of a BGR;
    and a navigation software core, resident on the server as non-transitory computer readable code, having the capability to create BGRs of such a size that explicit navigation solutions are possible within the boundaries of the BGR, to identify Node Pairs for each BGR which might be part of a potential solution, and to optimize a navigation solution based on the dependent variable provided by the user, said dependent variable being at least one of distance, time, fuel, or user-defined cost-function, and the independent variables which are inherently part of a solution database, said independent variables being at least a plurality of day of week, date, time of day, a unique driver identifier, and unique vehicle identifier;
    wherein BGRs are generated in the map database by first performing, on the server, at least one of
        projecting equidistant latitude lines across all said map database areas of interest, and
        identifying a plurality of corners of each said BGR.

* * * * *